United States Patent
Du et al.

(10) Patent No.: US 9,990,557 B2
(45) Date of Patent: Jun. 5, 2018

(54) REGION SELECTION FOR IMAGE MATCH

(71) Applicant: A9.com, Inc., Palo Alto, CA (US)

(72) Inventors: Ming Du, Redwood City, CA (US); Arnab Sanat Kumar Dhua, Mountain View, CA (US); Michael Patrick Cutter, Santa Cruz, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days. days.

(21) Appl. No.: 15/711,580

(22) Filed: Sep. 21, 2017

(65) Prior Publication Data

US 2018/0012102 A1   Jan. 11, 2018

Related U.S. Application Data

(63) Continuation of application No. 14/662,896, filed on Mar. 19, 2015, now Pat. No. 9,798,949.

(51) Int. Cl.
| | | |
|---|---|---|
| *G06K 9/46* | (2006.01) | |
| *G06K 9/00* | (2006.01) | |
| *G06K 9/62* | (2006.01) | |

(52) U.S. Cl.
CPC ........... *G06K 9/46* (2013.01); *G06K 9/00268* (2013.01); *G06K 9/00362* (2013.01); *G06K 9/468* (2013.01); *G06K 9/6201* (2013.01); *G06K 2009/4666* (2013.01)

(58) Field of Classification Search
None
See application file for complete search history.

(56) References Cited

U.S. PATENT DOCUMENTS

| | | |
|---|---|---|
| 2010/0183221 A1 | 7/2010 | Ohtake et al. |
| 2011/0142335 A1 | 6/2011 | Ghanem et al. |
| 2012/0140987 A1 | 6/2012 | Singh et al. |
| 2013/0044944 A1 | 2/2013 | Wang et al. |
| 2013/0071816 A1 | 3/2013 | Singh et al. |
| 2015/0170005 A1 | 6/2015 | Cohen et al. |
| 2015/0186748 A1 | 7/2015 | Cootes et al. |

OTHER PUBLICATIONS

Garcia, Christophe, and George Tziritas. "Face detection using quantized skin color regions merging and wavelet packet analysis." IEEE Transactions on multimedia 1.3 (1999): 264-277.
Non-Final Rejection issued in U.S. Appl. No. 14/662,896 dated Aug. 25, 2016.
Final Rejection issued in U.S. Appl. No. 14/662,896 dated Apr. 25, 2017.
Notice of allowance issued in U.S. Appl. No. 14/662,896 dated Jul. 5, 2017.

*Primary Examiner* — Manav Seth
*Assistant Examiner* — David Perlman
(74) *Attorney, Agent, or Firm* — Hogan Lovells US LLP

(57) ABSTRACT

The accuracy of an image matching process can be improved by determining relevant swatch regions of the images, where those regions contain representative patterns of the items of interest represented in those images. Various processes examine a set of visual cues to determine at least one candidate object region, and then collate these regions to determine one or more representative swatch images. For apparel items, this can include locating regions such as an upper body region, torso region, clothing region, foreground region, and the like. Processes such as regression analysis or probability mapping can be used on the collated region data (along with confidence and/or probability values) to determine the appropriate swatch regions.

20 Claims, 10 Drawing Sheets

REGION SELECTION FOR IMAGE MATCH

CROSS-REFERENCES TO RELATED APPLICATIONS

This application is a continuation of allowed U.S. application Ser. No. 14/662,896, entitled "REGION SELECTION FOR IMAGE MATCH," filed Mar. 19, 2015; of which the full disclosure of this application is incorporated herein by reference for all purposes.

BACKGROUND

Users are increasingly utilizing electronic devices to research, locate, and obtain various types of information. For example, users may utilize a search engine to locate information about various items, such as items offered through an electronic marketplace. Conventional approaches to locating content involve utilizing a query to obtain results matching one or more terms of the query, navigating by page or category, or other such approaches that rely primarily on a word or category used to describe an item. Such approaches can make it difficult to locate items based on appearance or aesthetic criteria, such as a specific pattern or texture of material. Thus, users can have difficulty locating the appropriate items, or may at least have to navigate through many irrelevant results before locating an item of interest. While approaches exist for matching images, these typically match based on the entire contents of the image, which can result in matches that do not correspond to the actual item of interest.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to locating and/or providing digital content in an electronic environment. In particular, various embodiments provide for the determination of one or more representative swatch regions of an image that can be used to attempt to locate matching images having a corresponding pattern, texture, or other visual identifier. Approaches discussed herein provide for the determination of such swatch regions with minimal processing requirements, and enable matches to be performed using the most relevant portions of an image.

In various embodiments, multiple modules are used to determine candidate image regions. For items such as apparel items, these regions can be based upon head or upper body locations as determined by an appropriate object detection algorithm, or can be based upon locating regions of skin color and selecting other regions that are likely to correspond to apparel worn by the person represented in the image. Other modules can be used as well, as may include determining a foreground region, hair region, body pose data, and the like. The candidate regions from these modules then can be collated or otherwise analyzed to determine a candidate region for an image swatch. One or more image swatches can be selected, such as unique swatches that can each be used to attempt to match a respective apparel item or pattern in the image. Such an approach provides for image swatches that allow for a more accurate match than when attempting to match an input image as a whole, which can contain various other objects or portions not related to the item or content of interest.

Various other functions and advantages are described and suggested below as may be provided in accordance with the various embodiments.

Figure 1A:
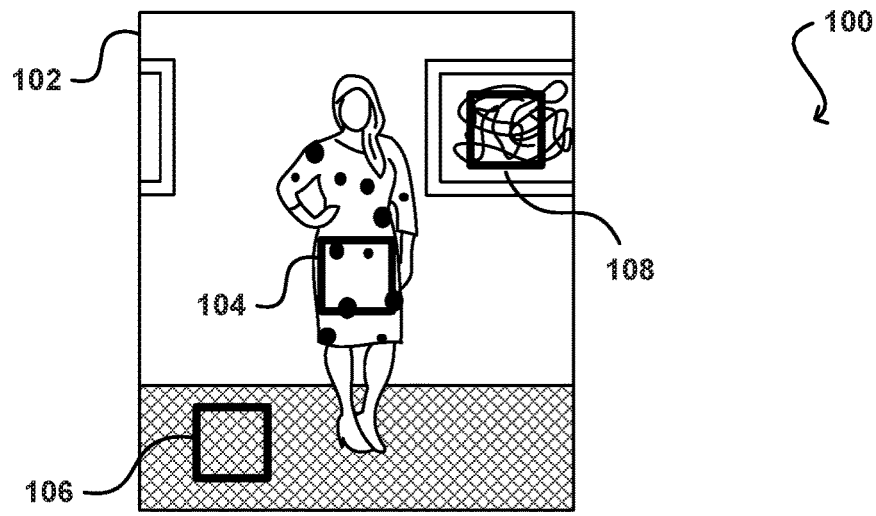
FIGS. 1A and 1B illustrate examples of an approach that can perform image match based on image swatches that can be utilized in accordance with various embodiments.
Figure 1B:
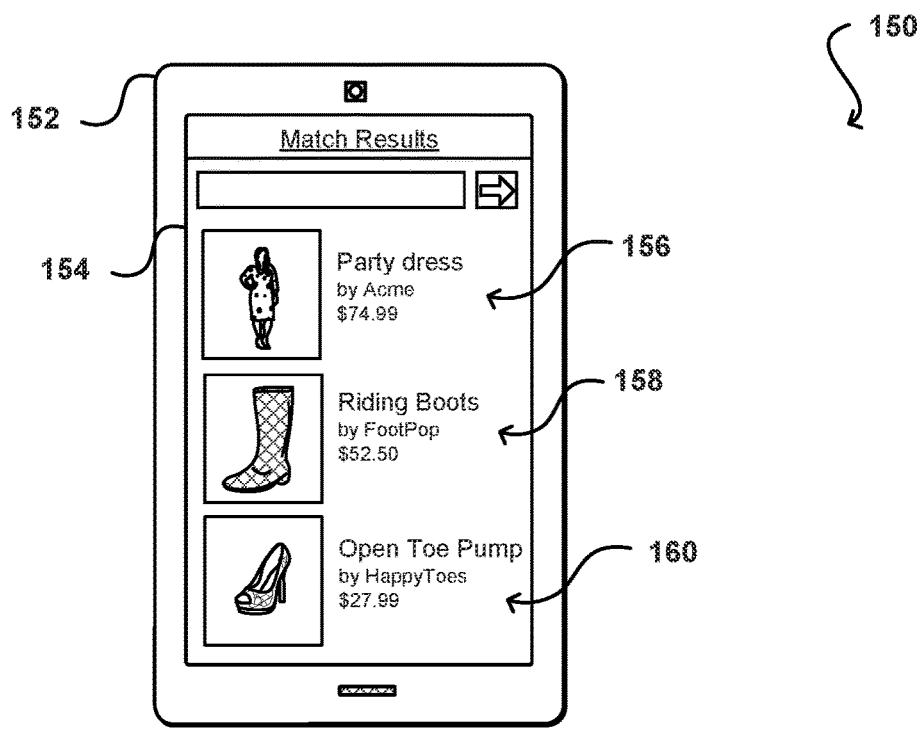

FIG. 1A illustrates an example situation 100 that can be utilized to attempt to locate matching images in accordance with various embodiments. In this example, an image 102 is obtained that includes a representation of a woman wearing a dress. It can be the case that a user likes the dress and wants to locate information about that dress, or likes the pattern of the dress and wants to locate other items, such as apparel items, that have a similar pattern. As illustrated, however, the image includes multiple regions of different patterns, as may correspond to the dress, a painting, and the carpet, among others. Attempting to match against the entire image can be difficult unless the image was obtained from an electronic catalog or matching database against which the search will be performed, as the features of the image that would be used for a conventional image search can include feature points relating to not only the dress, but also the person wearing the dress, the paintings, the frames, the carpet location, and other such feature points. Various conventional approaches can attempt to separate out a foreground object from the background objects, but such approaches can be difficult, computationally expensive, and not highly accurate. While attempts can be made to select portions of the image for matching, it can be seen that different regions 104, 106, 108 can include very different patterns. While matching items or objects can be located through an image match based on these regions, as illustrated in the example situation 150 of FIG. 1B, the results illustrated on the display 154 of the computing device 152 match different portions of the image. If the user is interested in items matching the pattern of the dress, only one 156 of the displayed results will be relevant, while the results matching the carpet and painting (158 and 160, respectively) will likely be irrelevant to the user. While in the example situation 150 of FIG. 1B this may not be a significant issue, as content for the item of interest is displayed first, in situations where there are many search results the item of interest might be buried in the results such that the experience of locating the item can be frustrating for the user, and might result in the user not locating the content of interest. It should be noted that, although dresses are used as an example, various other types of items or objects, apparel related or not, can benefit from aspects of the various embodiments as should be apparent in light of the teachings and suggestions contained herein.

Systems and methods in accordance with various embodiments address these and other deficiencies with existing approaches by providing automated processes for determining image swatches that can be used to locate content of interest to a user. These approaches can be executed relatively cheaply and inexpensively by using relatively computationally inexpensive steps to determine regions of high probability from which image swatches can be extracted for matching. The regions can be processed in different ways, such as through regression processing or probability map generation, in order to determine image swatches with a high probability of representing the object of interest. The types and/or selection of steps utilized can depend at least in part upon the types or categories of images or objects to be analyzed and/or matched, as steps useful for locating a pattern of a dress worn by a person can be very different from a painting hanging on a wall, or other such objects. The location of image swatches provides for visual information-based searching as opposed to text queries, for example, which can be more intuitive, convenient, and accurate for items such as apparel items.

As mentioned, a difficulty with processing image or video input relates to the ability to precisely segment out an item of interest, such as an apparel item, from the surrounding background or other objects. This can be particularly difficult for items such as apparel items that are deformable, as the shape can change due to who is wearing the item or how it is otherwise presented in the image, such that a shape or contour detection algorithm may not provide sufficient accuracy. However, locating a reasonably-sized image patch, or "swatch" containing values for a contiguous subset of pixels, from the interior of the object of interest can often provide sufficient data for finding matching items. Multiple visual cues can be utilized to extract representative swatches from images of objects, such as apparel items. Such an approach avoids difficult segmentation problems, and working in the swatch domain improves processing efficiency and overall user experience as discussed elsewhere herein. In some embodiments, extracted swatches can be used to build a database against which visual search queries can be executed, further providing for quick and accurate results with minimal processing required.

In one example process, a set of visual cues is analyzed to attempt to determine an appropriate swatch location, region, and/or size. It should be understood that the selection of visual cues utilized is merely an example, and that other options and combinations can be utilized as well. Further, although the visual cue analysis will be discussed sequentially for ease of explanation, it should be understood that the cues can be analyzed concurrently or in other orders in various embodiments.

Figure 2A:
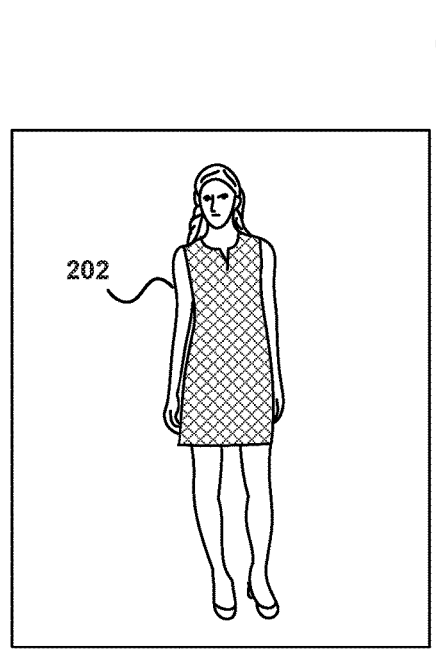
FIGS. 2A, 2B, 2C, and 2D illustrate stages of a process for determining a foreground region of an image that can be utilized in accordance with various embodiments.
Figure 2B:
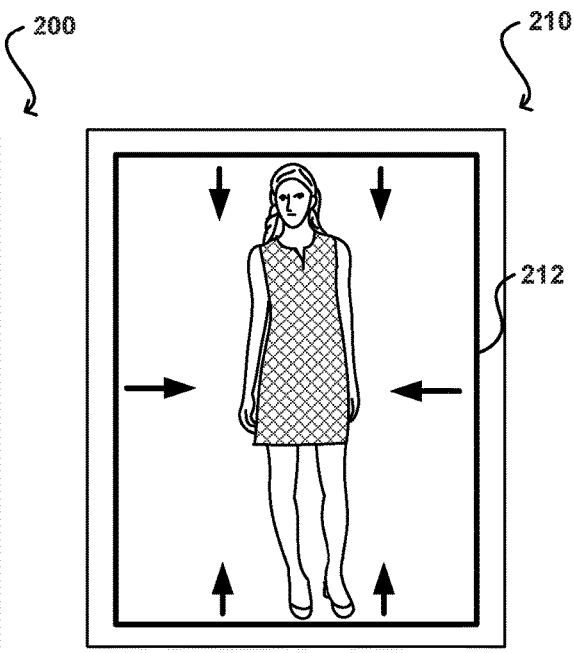
Figure 2C:
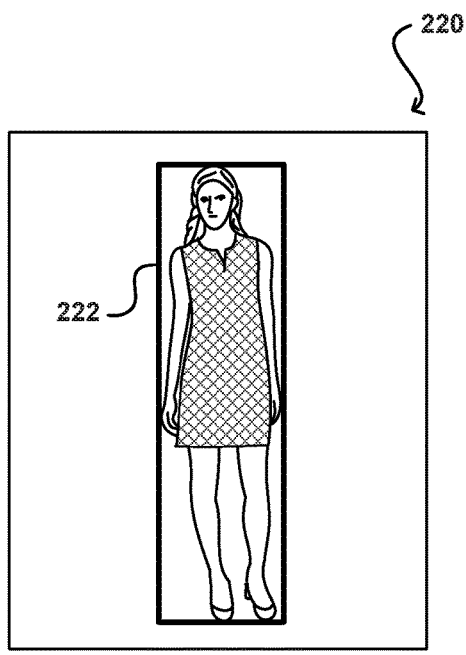

In one embodiment, a first visual cue is analyzed through the use of a foreground detection module, or other such process, system, or component. The module can receive an input image, such as a query image received from a user or third party provider, and attempt to locate a region of foreground that is more likely than a background region to contain a representation of an object of interest. FIGS. 2A-2C illustrate an example of one such process that can be utilized in accordance with various embodiments. In this example, the obtained image 200 includes a representation of an object 202 of interest, in this case a dress being worn by a person. It should be understood that in some images a person might not be present, or only a portion of a person might be represented, among other such options. In the example situation 210 of FIG. 2B, a foreground location process begins by starting at the corners and/or edges of the image and moving each side of a rectangle 212 inward until an edge or portion of a contour of an object is detected. It should be understood that a rectangle is used here for speed and simplicity because the image of interest is rectangular, but that other shapes can be used as well, such as squares, circles, and irregular shapes or contours. In some instances the background color will be known such that the process can move inward until a region with a color other than the background is determined. In other embodiments, the background color may need to be determined or background objects in the image removed using any appropriate process known or used for such purposes in other image-related processes. Some embodiments can attempt to grow connected regions of background color (or ranges of background color) towards the center of the image to the extent possible. A connected component analysis can be utilized to attempt to connect the entire background region of the image, with the remaining region(s) being considered the object(s) of interest. For images with multiple such object regions, one or more rules or policies could be utilized that indicate to select only the top region, most central region, largest region, etc. A bounding box could then be selected, for example, that is the tightest axis-aligned box that will fit around the selected object(s).

After each edge has stopped at an edge or contour of an object, a rectangularly bound region 222 of the image will be determined that will include the object of interest, as illustrated in the example situation of FIG. 2C. A geometric transform can be applied to the bounds of the region (for this and other regions discussed herein) in order to determine the optimal region from the candidate regions, such as to obtain the largest size with a reasonable aspect ratio. This region can represent a foreground region of the image, wherein the area inside the foreground region has a higher probability of containing the object of interest than the area outside the foreground region.

Figure 2D:
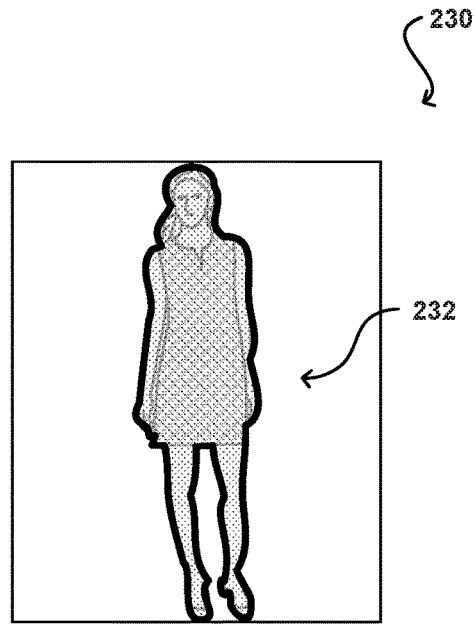

In at least some embodiments, a different approach can be taken to attempt to determine the region corresponding to the object versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered the object(s) of interest. In FIG. 2D, an outline or mask region 232 can be determined that then corresponds to the foreground (or background) portion of the image. This can be used to crop the image based on the location of the object, or can be used to expand the object to the appropriate aspect ratio, as discussed elsewhere herein. If the image includes multiple objects, the connected components analysis can still connect the background regions, which can result in determining multiple objects in the image as discussed in detail later herein.

In some embodiments a probability function or other variation can be determined based at least in part upon the foreground region. For example, the foreground region can be assigned a single probability for each pixel location, or pixels towards the middle of the foreground region can be assigned higher probabilities than pixel locations near the edge (and outside) the foreground region. In some embodiments the probability outside the foreground region might be set to zero, while in other embodiments the probability might trail off with distance from the foreground region, hitting a probability of zero at, or near, the edge of the image. Various other probability functions and approaches determined based at least in part upon the location of the foreground region can be utilized as well within the scope of the various embodiments. A confidence value can be obtained for the location of the region as well, such as may be determined at least in part by the number/percentage of background pixels contained within that region, in at least some embodiments. It is expected that, in general, the object of interest will occupy at least a minimum amount of the pixels in the image as a whole, as well as in the determined foreground region. A normal distribution can be created based on this, as may be determined using an average with a standard deviation. Further, in some embodiments the background will have a determined color which may match the color of some of the items of interest contained within the images. The confidence score may be lower in such a situation, as many of the pixel values for the object would correspond to the background color, and it may be difficult to determine which portions correspond to the object and which portions correspond to the background without further analysis. In some embodiments, the number of pixels of background color within the determined region can be counted and then normalized to a score between 0 and 1, using a normal distribution, to provide the level of confidence.

Figure 3A:
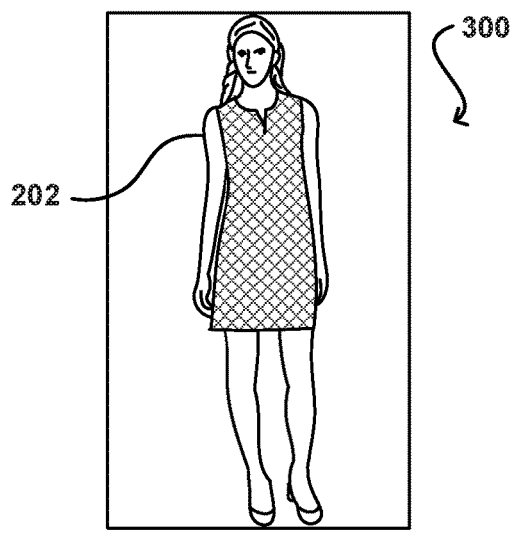
FIGS. 3A, 3B, 3C, and 3D illustrate stages of an example process for determining a torso region and/or upper body region that can be utilized in accordance with various embodiments.
Figure 3B:
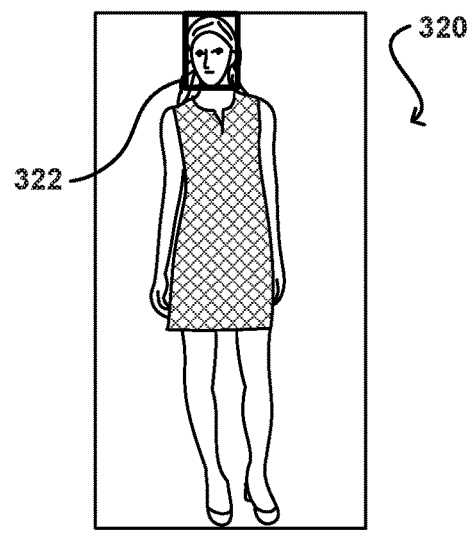
Figure 3C:
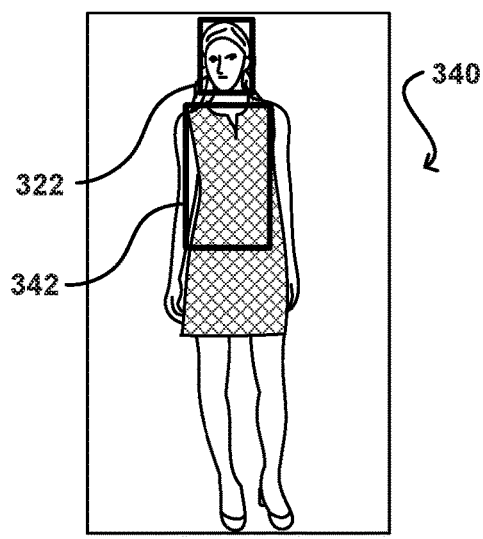
Figure 3D:
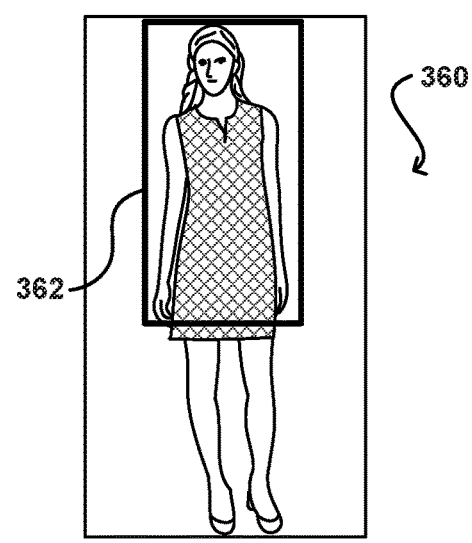

Another visual cue can be analyzed using one or more features located in the image. This can include using an object detection process, as may be based upon a Viola-Jones algorithm, deformable parts model (DPM), or other object detection algorithm, process, or framework. In some embodiments a Deformable Part Model (DPM)-based detectors can be utilized, such as may be based on a histogram of gradient (HOG) feature and structural support vector machine (SSVM). Such a process can be used to locate specific features or objects such as the head, face, body, upper body, or torso of a user, among other such options. As illustrated in the example situation 300 of FIG. 3A, the input to this module (or set of modules) can be the image including the representation of the object of interest 202, although in some embodiments the background portion from the prior step might be removed in order to reduce the amount of image data to be processed. From such an image, a face or head recognition process can be used to attempt to locate a face or head in the image, at least in the upper portion (e.g., top half or quarter) of the image. As illustrated in the example situation 320 of FIG. 3B, a location or bounded region 322 identifying the location of such a face can be determined using an appropriate location algorithm as discussed elsewhere herein. From this region, a torso region 342 can be determined as illustrated in the example situation 340 of FIG. 3C. Since the torso of a person is typically located below the head or face in an apparel image, and since the torso is generally represented as being wider than the head or face, a torso region 342 can be determined that has at least a minimum probability of including the object of interest if worn on the torso of the person whose face is located in the image. In this example, the region 342 is a rectangular region, although various other shapes can be utilized as well as may be based at least in part upon the probability relative to the face position. Further, the dimensions and location of the region can be based upon parameters of the human body, as a torso is likely to have a range of widths, lengths, and positions relative to a head region of a determined size and location. It should be understood that the region could have a single probability value or a distribution of probability values, as is described above with respect to the foreground region. Similarly, an object detection process or module can be used to locate an upper body region 362 of the image as well, as illustrated in the example situation 360 of FIG. 3D. The probabilities, as discussed previously, can be a fixed value for each pixel position in the region or might be distributed across the region, whether from a central point or from a point that is centered right to left but below center in the region (in the figure), as the apparel is likely to be located in a central location but below the face of the user, which will typically be represented in the top portion (e.g., top 20% or 25%) of the upper body region. It should be understood that terms such as "up," "down," and "top" are used for purposes of explanation and that other arrangements or directions can be used as well within the scope of the various embodiments as appropriate. In some embodiments the upper body region might be selected to start below the face or head region in the image, such that the location of highest probability might be in the center of the region.

Figure 4A:
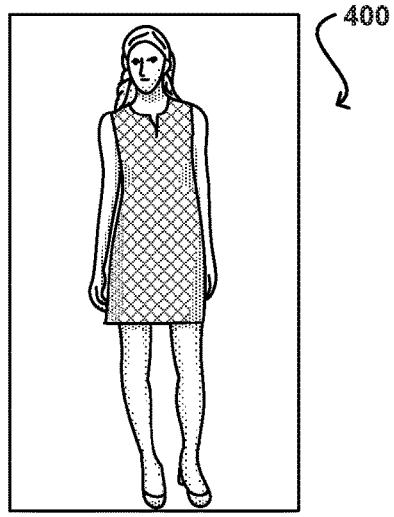
FIGS. 4A, 4B, 4C, and 4D illustrate stages of an example process for determining a clothing region of an image that can be utilized in accordance with various embodiments.
Figure 4B:
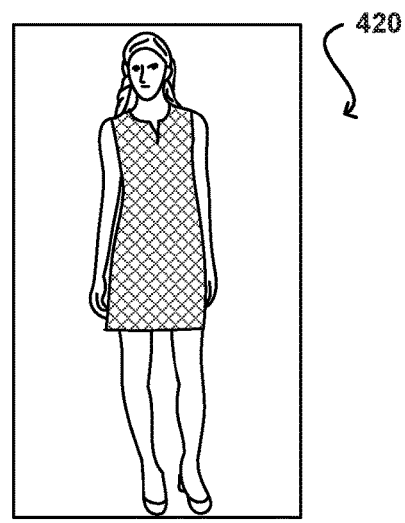
Figure 4C:
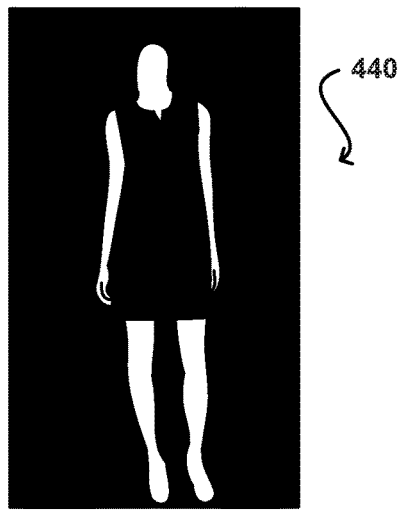
Figure 4D:
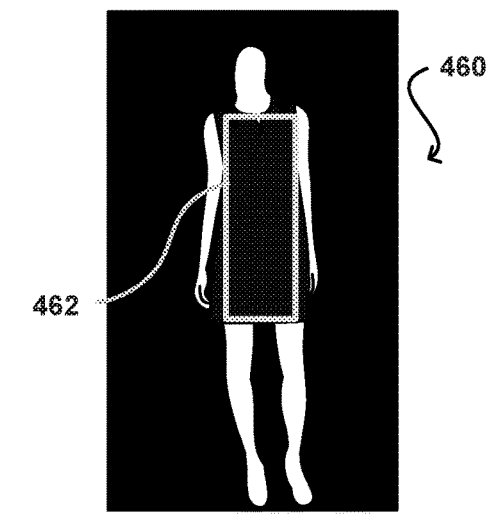

Another module can attempt to locate a clothing region that is located between (or otherwise positioned relative to) any or all skin regions of the image. In the example situation 400 of FIG. 4A, the obtained image including the representation of the object of interest will likely be a full color (e.g., 24 bit) image, or other such image with a conventional color depth. In order to locate the clothing region without utilizing a complex image recognition process, approaches in accordance with various embodiments can attempt to locate regions of skin color or skin tone that are positioned in a way that would be expected for a person represented in the image. The skin colors can have ranges of values that can depend at least in part upon the color space, color depth, etc. In order to improve accuracy, in at least some embodiments a version of the image is produced, as illustrated in the example situation 420 of FIG. 4B, which is quantized, or has a reduced color depth. Reducing the color depth to, say, 256 color can cause the skin regions to have less color variation and thus be more likely detected as contiguous regions of skin color. From the quantized image, the color of each pixel in the image can be analyzed to determine whether each pixel is, or is not, colored with a color value that is within a determined range of skin tones. For pixels in that range, those pixels can be assigned a first value, such as 0. For pixels with colors outside the skin color range, those pixels can be assigned a second value, such as 1. The result can be a mask image (or mask data set), such as is illustrated in the example situation 440 of FIG. 4C, wherein the regions of skin are identified with respect to the non-skin regions. For example, the leg, arm, and head regions of the image are readily identifiable from the skin mask image. In some cases the hair of a person may show up as a skin region in the skin mask, such as where the color of the hair is within the skin tone range of colors, but such appearance should not impact the determination of a clothing region as discussed herein. In order to determine a clothing region that is likely to include an appropriate image swatch region, a bounding box or other boundary can be used to determine a clothing region 462 inside the skin regions, as illustrated in the example situation 460 of FIG. 4D. As with the other regions, the probability can be of a single value within the clothing region or a distribution of values, as may decrease from a maximum probability value (e.g., 1.0, 0.8, 0.75, etc.) in the center of the clothing region, among other such options. As with other regions, a confidence score can be generated in some embodiments based at least in part upon the number or percentage of skin and/or background pixels contained within the region.

Figure 5A:
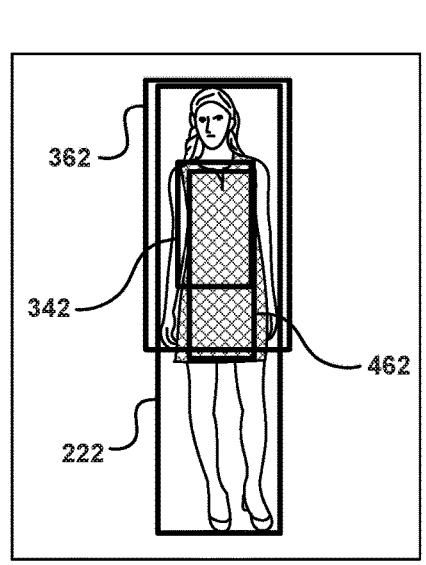
FIGS. 5A, 5B, 5C, and 5D illustrate stages of an example process for utilizing a probability map, based on the image regions, to determine an image swatch location that can be utilized in accordance with various embodiments.
Figure 5B:
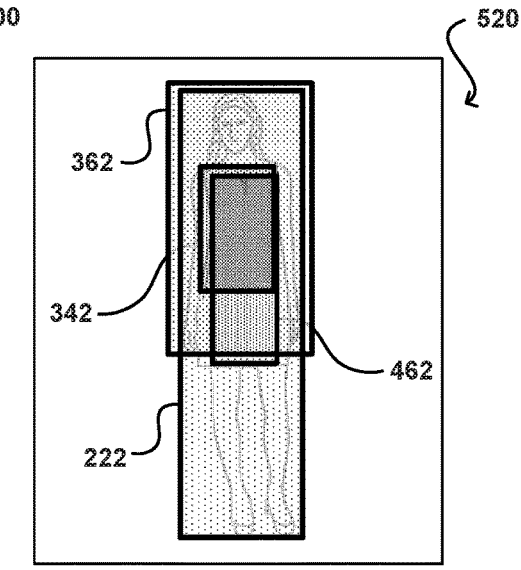
Figure 5C:
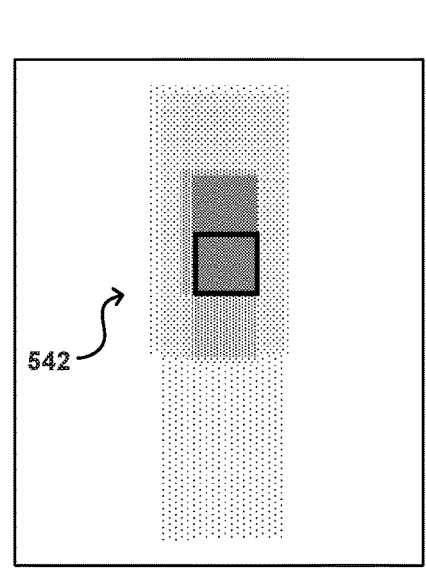
Figure 5D:
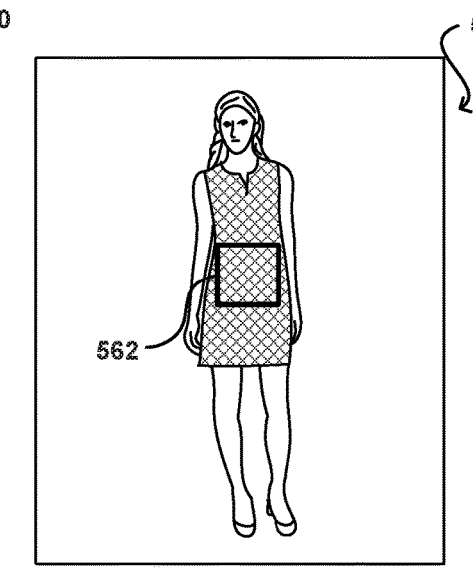

Once a set of regions has been determined for an input image, corresponding to the determined visual cues to be analyzed, the data for those regions can be collated or otherwise processed to attempt to determine one or more representative swatch regions for the image. The regions can be analyzed using any of a set of processing approaches, as may include regression model-based collation or probability map generation, among others. A probability map-based approach will be described with respect to FIGS. 5A-5D. In the example situation 500 of FIG. 5A, the various regions 222, 342, 362, and 462 determined previously can be compared or aggregated in order to determine regions of different probability. FIG. 5A shows the relative location of the regions, while FIG. 5B shows those regions shaded with increasing darkness to represent increased probability. It should be understood that the figures show simple additive probabilities of regions having single probability values for all pixel locations, that the area with the largest number of overlapping regions can have the highest probability, and thus appear darkest in the figure. It should be understood that probabilities can be distributed, as discussed, such that the probability map can look more like a heat map of varying probability instead of having regions of discrete probability as illustrated in the example situation 540 of FIG. 5C. Further, although entire regions are shown in the example heat map of FIG. 5C, it should be understood that one or more candidate swatches can be selected from each region, and the heat map or probability map can be generated using these candidate swatches instead of the entire regions.

Once the probabilities of the various regions are determined, at least one swatch region 542 can be selected that corresponds to the regions having the highest probability. The swatch can be selected to have at least a minimum size (e.g., number of pixels) and a minimum aspect ratio (i.e., not just a long, thin strip) in order to provide sufficient detail for the matching process, where the minimum size and aspect ratio can depend at least in part upon the process used and the level of accuracy desired. Using images without sufficient detail can result in image matches that are not sufficiently accurate, while requiring swatches with too much detail or size can result in some images not being able to undergo the matching process due to inability to locate such a swatch. In some embodiments the swatch is the largest region (square, rectangular, or otherwise) that will fit in a region having at least a minimum probability (e.g., at least 70% or more) of corresponding to the object of interest. Other approaches can be used as well, such as to select a swatch of predetermined size and shape positioned so as to maximize the average or total probability of the pixels contained within that region, among other such options. As illustrated, the location of the swatch region determined in FIG. 5C can be matched to the corresponding location 562 in the received image, as illustrated in the example situation 560 of FIG. 5D. The pixel values of this region then can be used for an image matching process, wherein the match is performed against the swatch region instead of against the entire received image. In some embodiments, a region of sufficiently high probability can be designated an apparel region, and one or more swatch regions can be selected from within that apparel region as discussed elsewhere herein.

Another approach involves using one or more regression models with the determined image regions. As discussed above, each region can include at least a set of coordinates defining the region in the image. Further, each region can have an associated probability, set of probabilities, and/or confidence score(s). Processing this data with one or more regression models can enable the regions to be fused according to the probability and/or confidence data in order to determine the image swatch region(s). Such an approach can involve at least one training stage for accuracy, and the regression model used can be based upon a linear regression model, random forest algorithm, Gaussian process, and the like. In some embodiments, the features used for the regression are in the form of a long vector obtained by concatenating the various region corner coordinates and their corresponding confidence values, thereby taking into account each detection result along with its confidence score. The long vector then can be used to perform training with the corresponding regression algorithm, and the trained model can be used to obtain the final image swatch location for the received image.

As mentioned, a variety of different modules can be used with such a process in order to determine one or more appropriate swatch regions for an image. In at least some embodiments it can be desirable to select at least some modules that are complementary to each other. For example, the background of an image might not have an appropriate background color or a person represented in the image might be wearing a skin tone outfit, which might cause one or more of the modules to not be able to determine a region with sufficient confidence. A selection of modules can be desirable that would still be able to determine an accurate swatch region even in these and other such situations. Further, detector algorithms can be trained to detect different portions of the body, as for certain apparel items it might be desirable to locate the lower body or entire body than the upper body, etc.

As mentioned, in some embodiments it may be possible to determine or extract multiple swatches from a determined apparel region. This can be useful for situations where the person represented in the image is wearing multiple items, such as a top and skirt as opposed to a dress. It is also possible that a single item might have regions with different patterns, among other such options. Thus, capturing only a single swatch might cause only one of the items to be represented in the search, or might cause a portion of each to be represented in a single swatch, which then might not result in any matches that include both patterns. Capturing multiple swatches enables multiple searches to be performed concurrently (or sequentially, etc.) in order to obtain results that match various items represented in the image.

In at least some embodiments, multiple candidate swatch regions can be analyzed within a determined apparel region. These candidate regions can be compared against one another in order to remove redundancies. For example, if a pattern matching algorithm indicates that the patterns within two candidate swatch regions match with a minimum level of confidence, one of the candidate swatch patterns can be removed from consideration for being redundant. In this way, only swatches that are sufficiently different will be selected for purposes of matching. In some embodiments these can all be automatically submitted to a matching process, while in other embodiments the swatch regions can be displayed over the image on a display screen of a computing device wherein a user can select one or more of the swatches to use to perform the search. In this way, the user can search for the precise item (or pattern) of interest in the case that swatches for multiple items (or patterns) are located in an image. In some embodiments, a maximum number (e.g., two or three) of swatches can be selected, where a criterion such as swatch dissimilarity can be used for selection. A comparison algorithm can be used that is resilient to small deformations in pattern appearance, which can be important for deformable items such as clothing where the pattern as represented in the image can vary based in part upon where the pattern is selected from the person wearing it. In some embodiments, a small set of candidate swatch regions can be selected initially from across the apparel region, and if the regions are determined to contain the same pattern then one can be selected as the swatch region without further analysis in order to conserve computing resources. The number of swatches selected for testing can be based on heuristics in at least some embodiments, in order to balance the amount of time and resources spent processing the data with the possibility that a certain pattern in an image might be missed. The sample regions can be at least partially overlapping or spaced apart, and can have the same orientation or different orientations and/or aspect ratios, among other such options. Other modules or processes can be used to attempt to determine locations of swatch candidates, as may include body pose detectors and the like.

Figure 6:
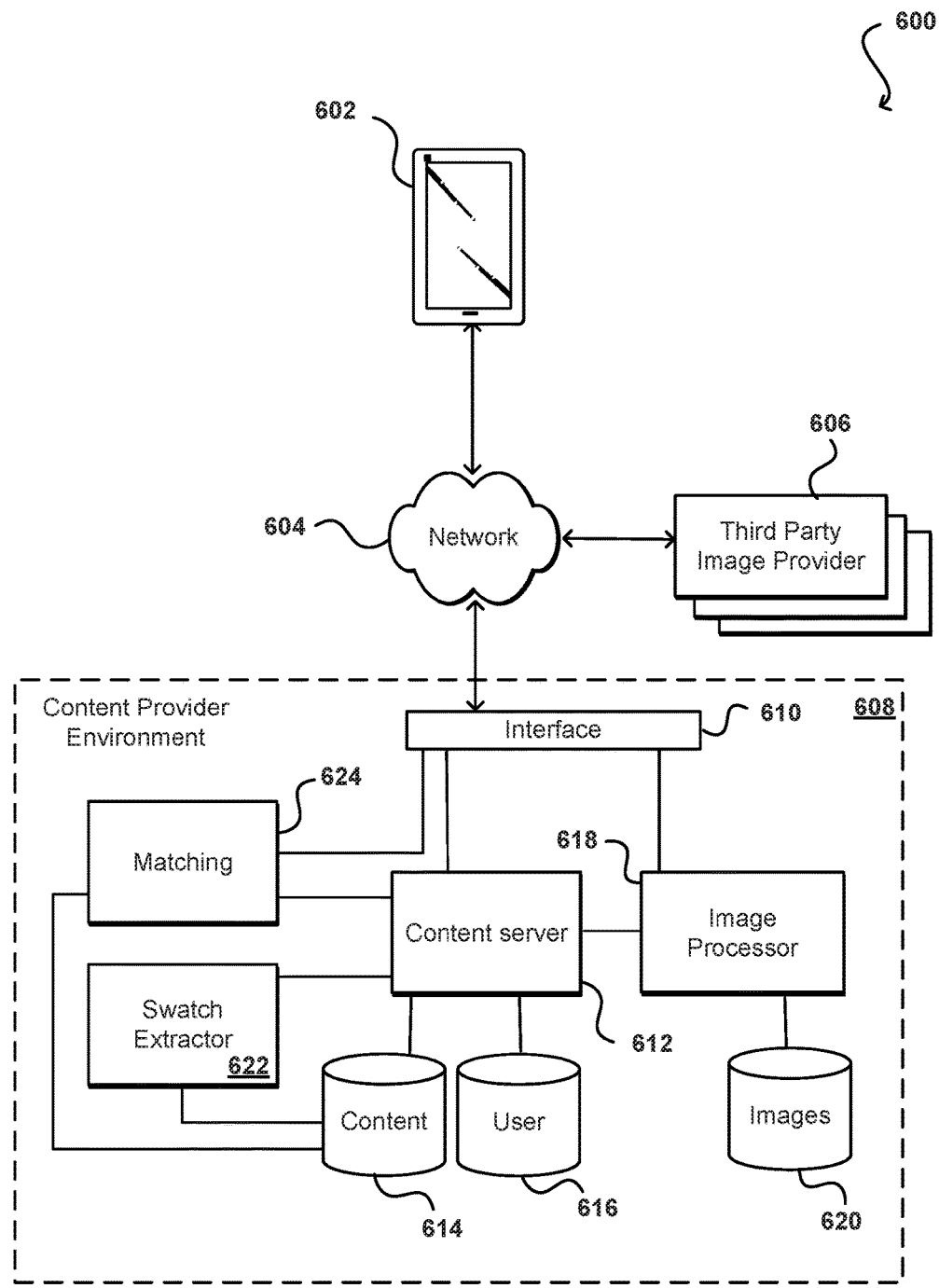
FIG. 6 illustrates an example system that can be used to manipulate images in accordance with various embodiments.

FIG. 6 illustrates an example environment 600 that can be used to implement aspects in accordance with various embodiments. In FIG. 6, a client computing device 602 can submit a request for content across at least one network 604 to be received by a content provider environment 608. The network(s) can include any appropriate network, such as the Internet, a local area network (LAN), a cellular network, an Ethernet, or other such wired and/or wireless network. The content provider environment 608 can include any appropriate resources for providing content from a resource provider, as may include various servers, data stores, and other such components known or used for providing content from across a network (or from the "cloud").

In this example, a call received to the resource provider environment 608 can be received by an interface layer 610 of the environment. As known for network environments, the interface layer can include components such as interfaces (e.g., APIs), load balancers, request and/or data routers, and the like. If the request is a request for content, such as for content for a page to be displayed in an application (e.g., browser), information for the request can be directed to one or more content servers 612, which can obtain the content from a content data store 614 or other such repository to be sent back across the network(s) to the computing device. In some embodiments, information for the request might also be compared against user data in a user data store 616 or other such location do determine, for example, whether the user has access rights to that content. In one example, the content can include a plurality of images to be displayed as part of a set of search results, although various other types of content and uses for images can be utilized as well within the scope of the various embodiments.

In some cases, a request received to the content provider environment 608 might be from another entity, such as a third party image provider 606. As discussed previously, such providers may provide images to be displayed to users along with the served content. The interface layer can determine the type of request and cause information to be forwarded to an image processor 618 or other such component, which in some embodiments can cause the images to be stored to an image data store 620 at least temporarily. Since it may be desirable to manipulate at least some of the images before being presented for display, as discussed herein, the image processor can process at least some of the images before causing those images to be stored in the content repository 614, for example, to be presented for display to a user or otherwise utilized.

The content provider environment 608 can also include a swatch extraction component 622, system, or service that is able to analyze images using approaches discussed herein, and determine one or more representative swatch images for each selected image. These can include, for example, images received from third party suppliers, images stored in the content database 614, or query images received from a user, among other such options. As mentioned, swatches can be extracted from query images in order to perform more accurate image matching, and can also be extracted from images to be used for the matching, in order to improve the match process by enabling patterns in query swatch images to be compared against patterns in swatches of images stored in the content database 614. These swatch images thus can also be stored in the content database 614, or another appropriate data store, at least for matching purposes. The content provider system 608 also can include at least one matching component 624, system, or service, which can receive information such as a query swatch image from the swatch extraction component 622 and attempt to locate a match from image data stored in the content database 614, whereby the results of the match can be passed to the content server 612 for transmission to the requesting computing device 602.

Figure 7:
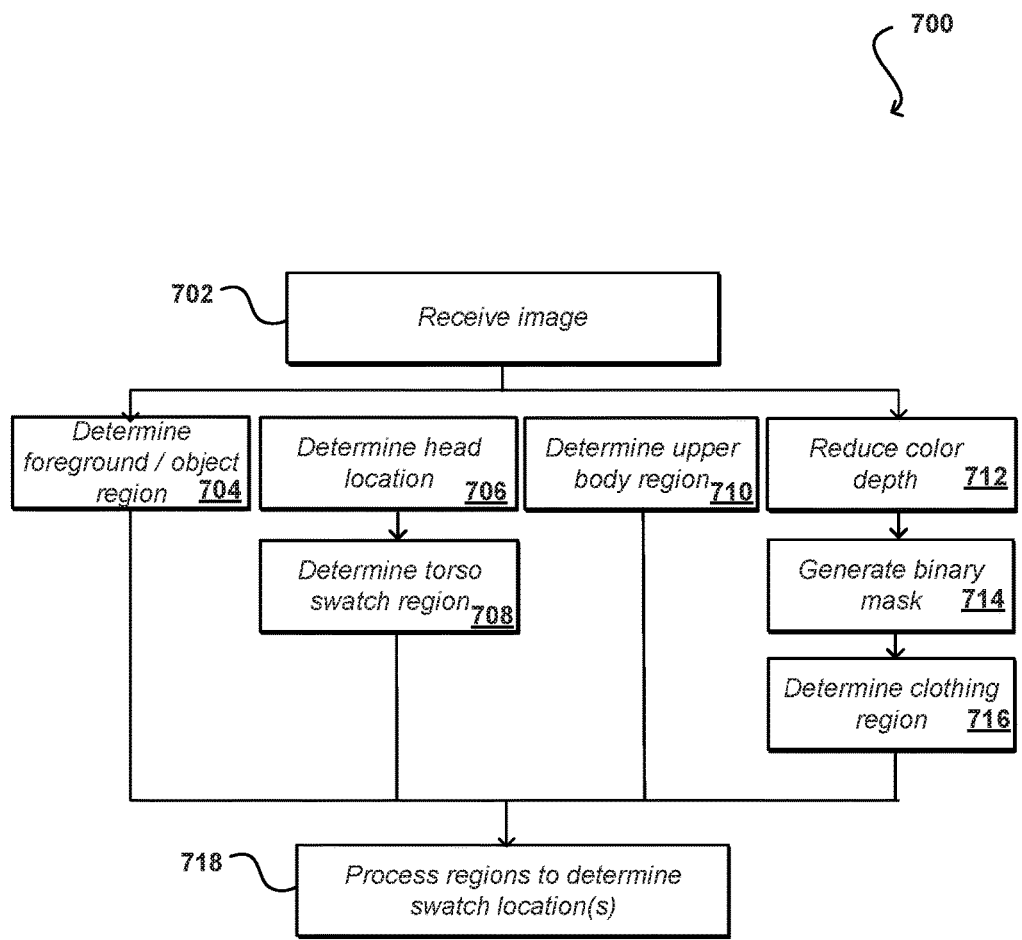
FIG. 7 illustrates an example process for determining an image swatch location that can be utilized in accordance with various embodiments.

FIG. 7 illustrates an example process 700 that can be utilized in such an environment in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an image is received 702, such as a query image from a user or a product image from a third party image provider, among other such options. As mentioned, in at least some embodiments such a process can be performed on images previously obtained as well. As part of the process, visual cue data can be analyzed using a set of modules, which is shown here in sequence but can be performed concurrently or in other orders in various embodiments. In this example, a foreground region and/or object region is determined 704. As discussed, this can include using a connected components analysis and/or starting at the edges (or corners, etc.) of the image and scanning or otherwise processing pixel data towards the middle of the image until a region of non-background colored pixels (or edge or contour of such a region) is located. Other processes for identifying a foreground or object portion of the image can be utilized as well within the scope of the various embodiments.

One or more object detection algorithms or other such processes can be used to locate specific portions of a body of a person represented in the image. This can include, for example, using a head detection algorithm to determine 706 a head location in the image. Based at least in part upon the head location and knowledge about the range of proportions and arrangements of the human body, a torso region can be determined 708 that is indicative of the likely position of the person's torso in the image based on the location of the head represented in the image. As mentioned, each of these regions can have associated probability and/or confidence value(s) determined that can affect the final swatch region determination. The same or similar algorithms can be used to determine 710 an upper body region in the image as discussed herein. In addition, this example process utilizes another module to determine a clothing region by first quantizing 712 a version of the input image in order to obtain a version with a reduced color depth. A binary skin mask can be generated 714 that separates regions having skin tone color from regions not having skin tone color. The mask data can be analyzed to determine 716 a clothing region that is located inside (or otherwise positioned with respect to) the regions of skin tone. Using the obtained region location data, the region location data (along with any appropriate confidence or probability data) can be processed 718 to determine at least one appropriate swatch location. As discussed, this can include generating probability map data in order to locate a region of sufficient probability or performing regression analysis to locate such a region. As mentioned, in some embodiments multiple candidate swatches can be analyzed and redundant swatches eliminated from consideration in order to obtain a set of sufficiently unique swatches that can be used for matching.

Figure 8A:
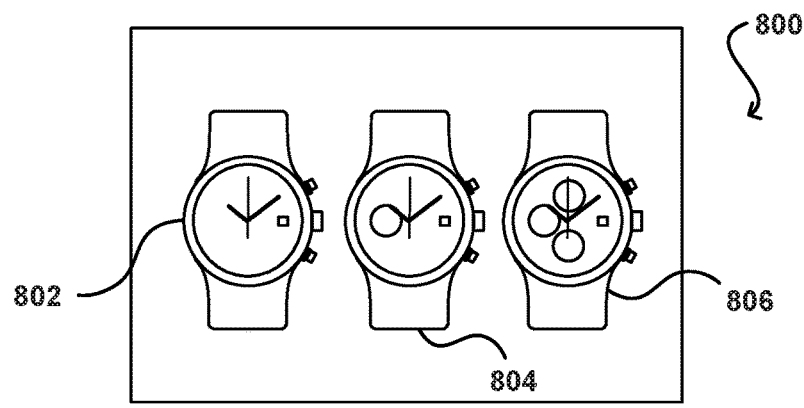
FIGS. 8A, 8B, and 8C illustrate stages of an example in which multiple object regions have been detected in accordance with various embodiments.
Figure 8B:
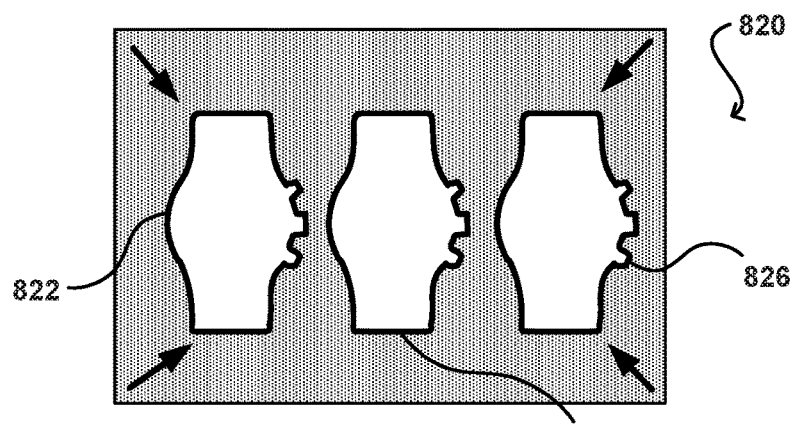
Figure 8C:
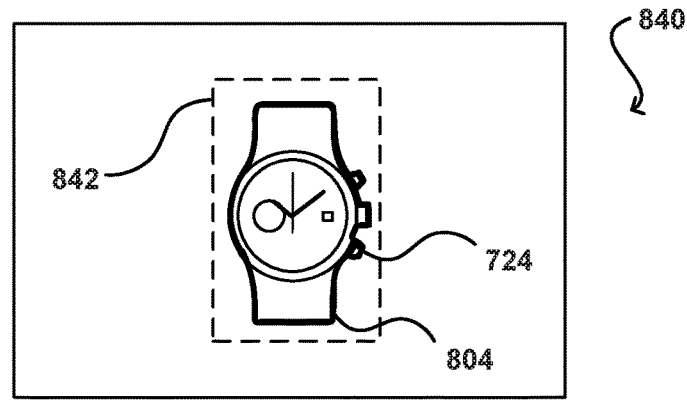

As mentioned, the use of a process such as a connected components analysis can result in multiple object regions being detected in an image. For example, the situation 800 of FIG. 8A illustrates that there are three watches 802, 804, 806 represented in an image. Using a connected components analysis starting from the corners, for example, can result in three separate contours 822, 824, 826 being determined, as illustrated in the example situation 820 of FIG. 8B. Various approaches can then either consider these objects together or as separate objects for purposes of cropping or image match. For example, a conservative approach would be to crop the image to include all three objects, in case they are part of a single product or group. Another approach would be to crop each object region into its own image in order to enable a search or other process for each of the object regions, or here for each watch. Another approach would select one of the object regions as representative, as may be based upon a central region, a largest region, a highest ranked or most confident region, etc. Various rules and/or policies can be put in place to determine how to handle the object regions in such situations. The policies can also vary by category. For example, in a toys category the objects might all be considered together, as they may include accessories or pieces of a single toy offering. For a category such as belts, where accessories are unlikely, a single object region might be selected that is the largest/most central. For objects such as shoes it may be desirable to separate the left and right shoes for image matching purposes, but ensure that they are linked to the same product and do not result in duplicate results. Various other options and approaches can be used as well as should be obvious to one of ordinary skill in the art in light of the teachings and suggestions contained herein. For each selected object, a swatch determination can be performed as discussed herein.

Figure 9:
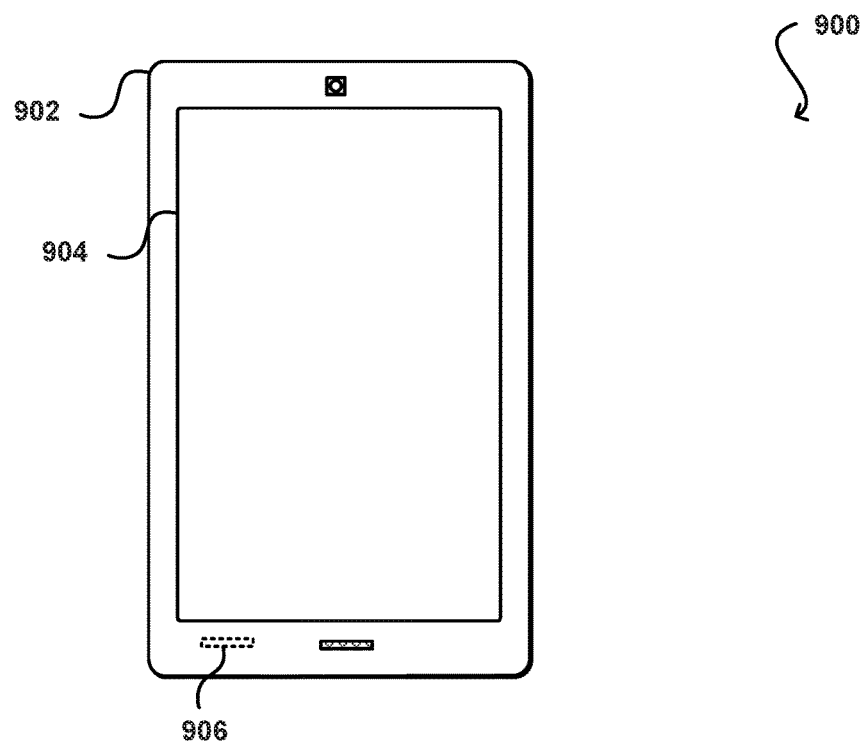
FIG. 9 illustrates an example computing device that can be utilized in accordance with various embodiments.

FIG. 9 illustrates an example computing device 900 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 10:
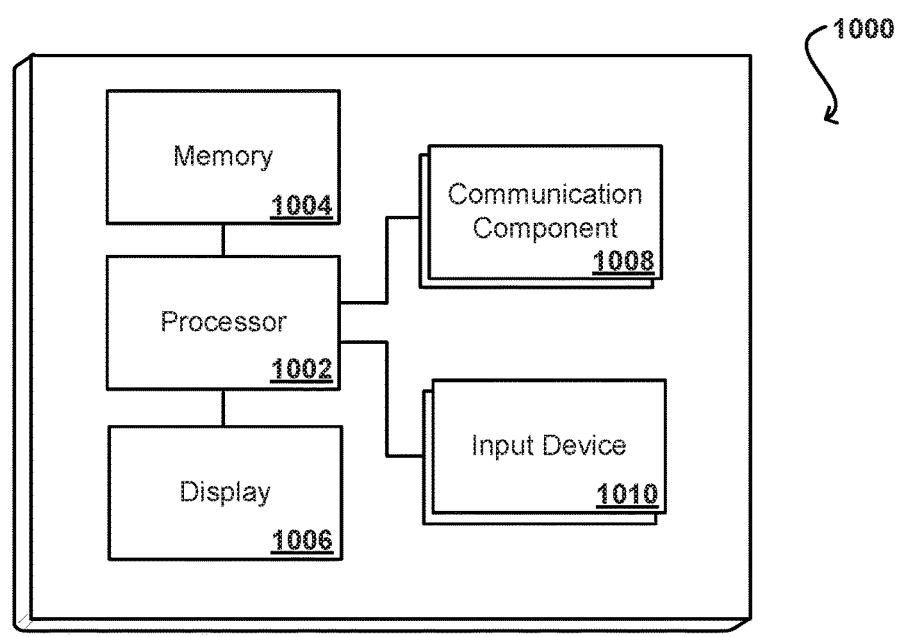
FIG. 10 illustrates an example configuration of components of a computing device, such as the device illustrated in FIG. 10.

In this example, the computing device 900 has a display screen 904 and an outer casing 902. The display screen under normal operation will display information to a user (or viewer) facing the display screen (e.g., on the same side of the computing device as the display screen). As discussed herein, the device can include one or more communication components 906, such as may include a cellular communications subsystem, Wi-Fi communications subsystem, BLUETOOTH® communication subsystem, and the like. FIG. 10 illustrates a set of basic components of a computing device 1000 such as the device 900 described with respect to FIG. 9. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device typically will include at least one type of display element 1006, such as a touch screen, electronic ink (e-ink), organic light emitting diode (OLED) or liquid crystal display (LCD), although devices such as portable media players might convey information via other means, such as through audio speakers. The device can include at least one communication component 1008, as may enabled wired and/or wireless communication of voice and/or data signals, for example, over a network such as the Internet, a cellular network, a Wi-Fi network, BLUETOOTH®, and the like. The device can include at least one additional input device 1010 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 11:
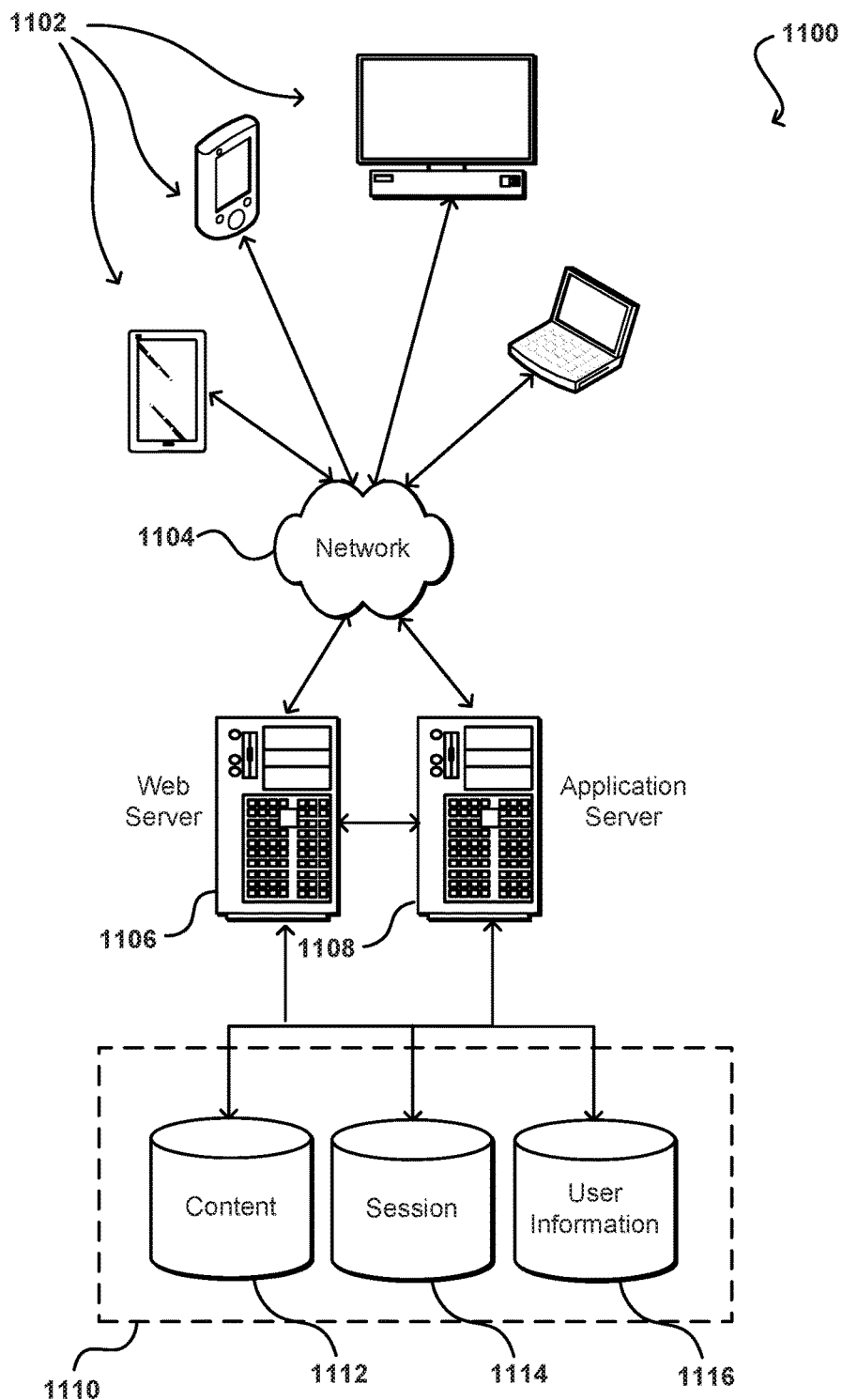
FIG. 11 illustrates an example environment in which aspects of the various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
at least one processor; and
memory storing instructions that, when executed by the at least one processor, cause the system to:
receive an image containing a representation of an object;
determine a set of candidate swatch regions based at least in part on a selection of an area of the image;
for each swatch region in the set of candidate swatch regions, identify a subset of pixels of the image based at least in part on the subset of pixels having at least a minimum probability of similarity to the representation of the object in the image;
selecting at least one swatch region from the set of candidate swatch regions based at least in part on the minimum probability of similarity to the representation of the object;
determine at least two or more sub-regions within the at least one swatch region;
collating data for the at least one swatch region to determine a sub-region representative of at least one visual aspect of the object; and
generating a swatch image using pixel values from within the sub-region, the swatch image used to perform a similarity matching process against a set of candidate images.

2. The system of claim 1, wherein the at least two or more sub-regions within the at least one swatch region are determined based at least in part on locations of the two or more sub-regions within the at least one swatch region.

3. The system of claim 1, wherein the instructions when executed further cause the system to:
scan in, from a set of at least one of edges or corners of the image, until one or more edges or contours of the representation of the object are located; and
determine, for each swatch region in the set of candidate swatch regions, whether it is a foreground region or a background region based on the one or more edges or contours of the representation of the object.

4. The system of claim 1, wherein the instructions when executed further cause the system to:
generate a quantized color image having a lower color depth than the image;
analyze the quantized color image to locate pixels having values of skin tones; and
generate a binary skin mask indicating the pixels having the skin tones in order to determine one or more skin regions from the at least two sub-regions.

5. A computer-implemented method, comprising:
receiving an image containing a representation of an object;
determining a set of candidate swatch regions based at least in part on the image, each candidate swatch region of the set corresponding to a subset of pixels of the image determined to have at least a minimum threshold of correspondence to the representation of the object in the image;
collating data for the set of candidate swatch regions to determine at least two or more sub-regions for each subset of pixels;
determining a swatch region representative of at least one visual aspect of the object based at least in part on the at least two or more sub-regions; and
generating a swatch image using pixel values from within the swatch region.

6. The computer-implemented method of claim 5, further comprising:
analyzing the image using a set of modules, each module corresponding to a respective visual cue.

7. The computer-implemented method of claim 6, wherein the respective visual cue for a module of the set of modules is selected from the group consisting of head location, upper body location, skin region location, body pose, hair location, accessory location, limb region, foreground location, and torso location.

8. The computer-implemented method of claim 5, further comprising:
performing a regression analysis to obtain a transfer function that uses the set of candidate swatch regions to determine the swatch region that is optimal for the object represented in the image.

9. The computer-implemented method of claim 8, further comprising:
utilizing at least one of a linear regression model or a random forest algorithm in the performing of the regression analysis.

10. The computer-implemented method of claim 8, further comprising:
determining at least one confidence value for each of the set of candidate swatch regions for use in the performing of the regression analysis, at least one confidence value determined based at least in part upon a number of pixels within a respective candidate swatch region having a value corresponding to a background color or a skin tone.

11. The computer-implemented method of claim 5, further comprising:
generating a probability map based on probability data for the set of candidate swatch regions, the object region being selected from a portion of the probability map having at least a minimum probability value.

12. The computer-implemented method of claim 11, wherein the probability data for a selected candidate swatch region of the set comprises a single probability value or a distribution of probability values.

13. The computer-implemented method of claim 5, further comprising:
determining, from within the object region, a set of candidate swatch regions; and
comparing the candidate swatch regions, within the set of candidate swatch regions, to remove a swatch region of each pair of redundant swatch regions, in order to determine the swatch region, the swatch region capable of being one of a set of swatch regions generated for the image.

14. The computer-implemented method of claim 5, further comprising:
performing an image match process against a set of object images using the swatch image; and
providing results of the image match process to a user having provided the image.

15. A non-transitory computer readable storage medium storing instructions that, when executed by at least one processor of a computing system, causes the computing system to:
receive an image containing a representation of an object;
determine a set of candidate swatch regions based at least in part on the image, each candidate swatch region of the set of candidate swatch regions corresponding to a subset of pixels of the image determined to have at least a minimum threshold of correspondence to the representation of the object in the image;
collate data for the set of candidate swatch regions to determine at least two or more sub-regions for each subset of pixels;
determine a swatch region representative of at least one visual aspect of the object based at least in part on the at least two or more sub-regions; and
generate a swatch image using pixel values from within the swatch region.

16. The non-transitory computer readable storage medium of claim 15, wherein the instructions, when executed by the at least one processor, further causes the computing system to:
analyze the image based on a set of visual cues, the set of visual cues including at least one of head location, upper body location, skin region location, body pose, hair location, foreground location, and torso location.

17. The non-transitory computer readable storage medium of claim 15, wherein the instructions, when executed by the at least one processor, further causes the computing system to:
perform a regression analysis on collated data for the set of candidate swatch regions to determine the object region.

18. The non-transitory computer readable storage medium of claim 15, wherein the instructions, when executed by the at least one processor, further causes the computing system to:
generate a probability map based on probability data for the set of candidate swatch regions, the object region being selected from a portion of the probability map having at least a minimum probability value.

19. The non-transitory computer readable storage medium of claim 15, wherein the instructions, when executed by the at least one processor, further causes the computing system to:
determine, from within the object region, a set of candidate swatch regions; and
compare the candidate swatch regions within the set of candidate swatch regions to remove a swatch region of each pair of redundant swatch regions to determine the swatch region, the swatch region capable of being one of a set of swatch regions generated for the image.

20. The non-transitory computer readable storage medium of claim 15, wherein the instructions, when executed by the at least one processor, further causes the computing system to:
determine at least one confidence value for each of the set of candidate swatch regions for use in the performing of the regression analysis, at least one confidence value determined based at least in part upon a number of pixels within a respective candidate swatch region having a value corresponding to a background color or a skin tone.

* * * * *